United States Patent [19]
Durschner et al.

[11] 3,898,368
[45] Aug. 5, 1975

[54] CONTROL ELECTRODE IN A SUPPORT INSULATOR OF AN ENCAPSULATED GAS-INSULATED TUBULAR LINE

[75] Inventors: Rolf Durschner, Mohrendorf; Werner Lehmann, Erlangen, both of Germany

[73] Assignee: Siemens Aktiengesellschaft, Munich, Germany

[22] Filed: Sept. 19, 1974

[21] Appl. No.: 507,630

[30] Foreign Application Priority Data
Sept. 24, 1973 Germany............................ 2347927

[52] U.S. Cl.................... 174/28; 174/99 B; 174/142
[51] Int. Cl................................................ H01b 9/04
[58] Field of Search............. 174/28, 29, 142, 73 R, 174/16 B, 99 B

[56] References Cited
UNITED STATES PATENTS

| | | | |
|---|---|---|---|
| 2,492,437 | 12/1949 | Palmer........................ | 174/142 UX |
| 3,324,272 | 6/1967 | Shankle et al. ................. | 174/142 X |
| 3,391,243 | 7/1968 | Whitehead............................ | 174/28 |
| 3,652,778 | 3/1972 | Sakai................................ | 174/16 B X |
| 3,809,795 | 5/1974 | Olsen et al............................ | 174/28 |
| 3,813,475 | 5/1974 | Cronin............................. | 174/28 X |
| 3,819,845 | 6/1974 | Tahiliani................................ | 174/28 |

Primary Examiner—Arthur T. Grimley
Attorney, Agent, or Firm—Kenyon & Kenyon Reilly Carr & Chapin

[57] ABSTRACT

This invention concerns a control electrode which is attached on the side adjacent to the inner conductor of an essentially conical support insulator between the inner and the outer conductor an an encapsulated, gas-insulated tubular line. The cross section of the control electrode is asymmetrical. The radius of curvature of the outer wall of the control electrode is increasing from the half of wider cross section toward the narrower half. With the invention, a gradual decrease of the field at the support insulator is achieved without stressing the support insulator with excessive voltage values per unit length.

6 Claims, 4 Drawing Figures

CONTROL ELECTRODE IN A SUPPORT INSULATOR OF AN ENCAPSULATED GAS-INSULATED TUBULAR LINE

BACKGROUND OF THE INVENTION

1. Field of the Invention

The invention concerns a control electrode which is attached on the side adjacent to the inner conductor of an essentially conical insulator between the inner and the outer conductor of an encapsulated, gas-insulated tubular line.

2. Description of the Prior Art

Encapsulated, gas-insulated tubular lines usually consist of a voltage and current-carrying inner conductor which is supported against the casing of the encapsulated tubular line by means of special support elements. The support insulators are not placed on the shortest path between the inner and the outer conductor, in order to create, among other reasons, the longest possible leakage paths in view of the compact dimensions of the tubular line. Rather, it has been found advantageous to make these support insulators conical bodies of rotation around the axis of the conductor. At the attachment points of the support insulator are provided at the inner conductor as well as at the casing of the tubular line, separate control electrodes, the purpose of which are to decrease the potential as gradually as possible between the inner conductor and the grounded casing.

Prior art control electrodes have been heretofore, turned bodies with symmetrical cross section areas at the joint between the support insulator and the inner conductor. These support insulators were satisfactory for the common transmission voltages of 100 kV and 220 kV and fulfilled their purpose. With increasing magnitude of the transmission voltages, however, a crowding of electric field lines occurs with prior art symmetrical control electrodes used with conical support insulators and thereby, an increase of the voltage stress of the support insulator on that half of the control electrode, which faces the attachment points of the support insulator at the outer conductor. On the basis of experience data on the aging of the support insulators it is considered as advantageous not to stress it with high voltages, even though theoretically they can withstand higher continuous stresses at higher voltages when they are new. In known control electrodes, however, voltage stresses occur in the support insulator at higher transmission voltages, from about 380 kV up, which still exceed the maximum stress values considered permissible.

It is an objective of this invention to provide a control electrode for the conical insulator or an encapsulated, gas-insulated tubular line, which does not create excessive voltage stresses of the support insulator.

SUMMARY OF THE INVENTION

The objective is met according to this invention, by the provision that the electrode cross section is asymmetrical to the mid-vertical of its base line resting on the inner conductor. This construction ensures that parallel sections, equidistant to the mid-vertical between the inner conductor and the outer wall of the control electrode facing the conductor casing, are shorter on the half which is facing the attachment points of the support insulator at the outer conductor, than on the other half. By flattening the control electrode on that half which is facing the attachment points of the support insulator at the outer conductor, the heavy crowding of equipotential lines, which occurs in the case of symmetrical control electrodes, is reduced in this half. Thereby, the high voltage stress per unit length of the support insulator is reduced, and even for high transmission voltages (for instance, above 380 kV), satisfactory values of the voltage stress of the support insulator are obtained.

For casting reasons it is advantageous here to make the control electrode of mushroom-shaped cross section and to make the transition between the spiral-shaped outer wall of the mushroom roof and the sides of the base, which are parallel to each other and are approximately at right angles to the inner conductor by means of circular arcs. This shape is particularly advantageous for the manufacture of the conical insulator arranged around the control electrode.

DESCRIPTION OF THE INVENTION

Figure 1:
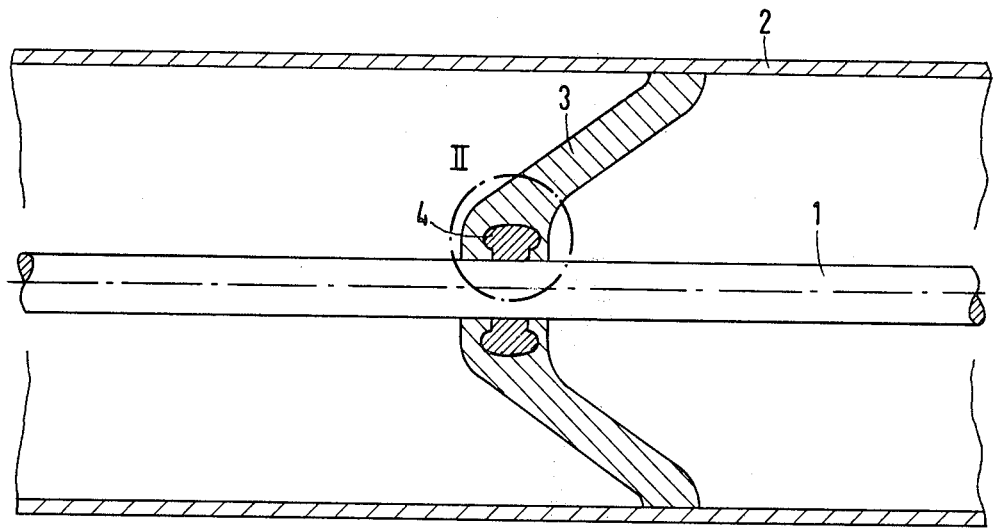
FIG. 1 shows a prior art encapsulated, gas-insulated tubular line in cross section with a control electrode.

In FIG. 1, a section from a prior art encapsulated, gas-insulated tubular line is shown. A conical support insulator 3 can be seen here, by means of which the inner conductor 1 is supported in the casing 2. To control the field reduction between the voltage- and current-carrying inner conductor 1 and the grounded enclosure 2 a control electrode 4 is attached in the support insulator 3 at the attachment point of the support insulator 3 on the inner conductor 1. Similar control electrodes are provided at the attachment point at the outer conductor, but they are not important here for the explanation and are therefore not shown. This control electrode 4 is connected electrically with the inner conductor. It is constructed of electrically conductive material and therefore has at its outer wall the same potential as the inner conductor.

Figure 2:
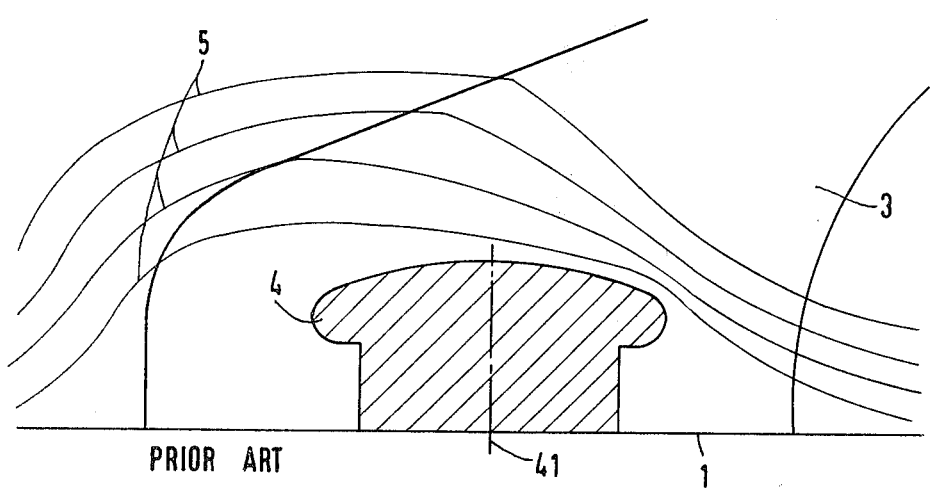
FIG. 2 shows a section from FIG. 1, in which the excessive crowding of equipotential lines in the support insulator is shown schematically.

FIG. 2, as does FIG. 1, shows prior art design of a control electrode. This control electrode is of annular shape. Its cross section is symmetrical with respect to the mid-vertical of its base line. The purpose of the control electrode 4 is to decrease the electric field between the inner conductor and the enclosure as gradually as possible, without the occurrence of point discharge effects. The outer envelope is therefore provided with a gradually changing curvature, avoiding sharp edges. In FIG. 2, four equipotential lines 5 are drawn. They are shown somewhat exaggerated in order to point up the problem. Due to the arrangement of the control electrode and the shape of the support insulator, these equipotential lines are lifted at the front of the support insulator (to the left in FIG. 2,) from the inner conductor 1, are refracted at the transition into the support insulator, are pinched somewhat in the right-hand half (FIG. 2) of the control electrode and, after another refraction upon leaving the support insulator 3, quickly run parallel to the inner conductor 1 again. At high operating voltages, however, the crowding of the equipotential lines within the support insulator above the right half of the control electrode shown in FIG. 2 is undesirable. This causes dielectric stresses in the support insulator which, theoretically, can be withstood over extended periods of time but which are too high when empirically determined safety coefficients are considered.

It is advantageous if the parallel sections which are equidistant to the mid-vertical of the cross section of the basis of the control electrode attached to the inner conductor on the half with the narrower cross section become shorter with incereasing distance from the mid-vertical. In this connection, it is advantageous if its outer wall has a radius of curvature which increases steadily from the half with the wider cross section toward the narrower half. This design of the control electrode is on the one hand advantageous for avoiding point discharge effects, for which no sharp edges of any kind must occur. At the same time, a largely homogeneous field pattern is obtained in the support insulator without creating potential steps.

The outer wall of the control electrode can have a cross section that follows a logarithmic spiral, whose radius vector is given in polar coordinates by the equation $r=ae^k\phi$ (where $a$ and $k$ are constant). In another embodiment the outer wall of the control electrode can have a cross section following a Sici spiral, which can be constructed from the integral cosine curve $$f_1(x) = \int_\infty^x \frac{\cos t}{t} dt,$$

and the integral sine curve $$f_2(x) = \int_\infty^x \frac{\sin t}{t} dt - \pi/2,$$

by plotting, for fixed values of $x$, the respective corresponding values in a rectangular coordinate system with the coordinate axes $f_1(x)$ and $f_2(x)$. Such a Sici spiral is shown in Jahnke-Emde-Loesch, "Tafeln hoeherer Funktionen" (Tables of higher functions), 7th ed., 1966, B. G. Teubner Verlagsgesellschaft Stuttgart, on page 21. In several computing experiments using an electronic computer, particularly the second form of the control electrode has been found very advantageous.

Figure 3:
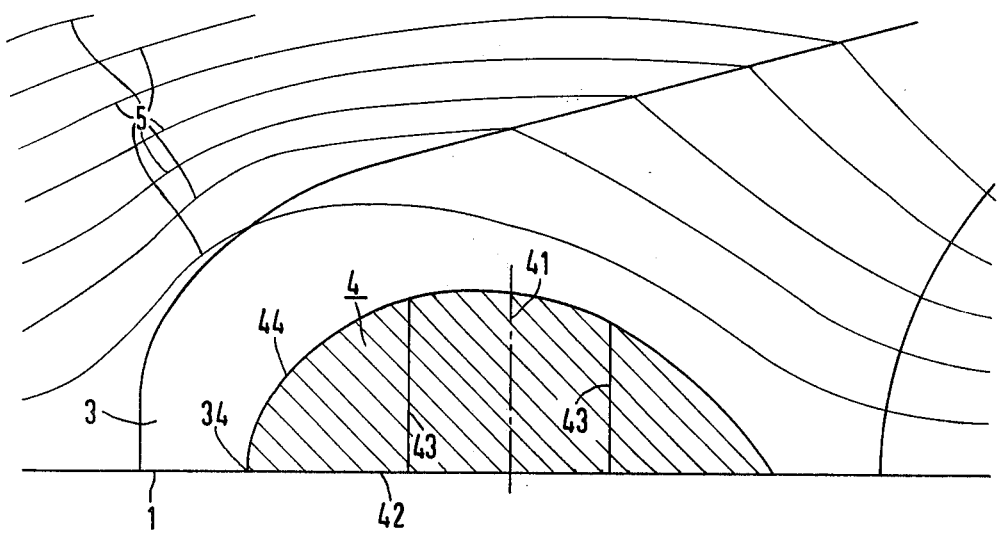
FIG. 3 shows an idealized example of an embodiment of a control electrode according to the invention and the corresponding pattern of the equipotential lines in the support insulator.

FIG. 3 shows an idealized example of an embodiment of the control electrode 4 according to the invention. Here, a shape was chosen for the outer wall whose cross section follows a Sici spiral. In this spiral, the radius of curvature increases exponentially from the wider half (at the left in FIG. 3) toward the narrower half. It can be seen clearly how the crowding of the equipotential lines 5 shown in FIG. 2 is greatly reduced for the same external dimensions of the insulator. Also at the rising edge of the support insulator (to the left in FIG. 3,) the crowding of the equipotential lines is less than with the prior art control electrodes, which also results in a lower voltage stress of the insulating gas in proximity thereto. In addition, the smaller extent of the control electrode in the right-hand part of FIG. 3 makes possible a reinforcement of the support insulator without increasing its external dimensions. This is possible because of the smaller space required by the control electrode.

Thus it is apparent that corresponding sections 43 parallel and equidistant to the mid-vertical 41 of electrode 4 are shorter on the right of the mid-vertical (toward the attachment of the support 3 to the outer wall 2) than to the left. It is further apparent that these parallel sections 43 become increasingly shorter on the right of the mid-vertical with increasing distance from the mid-vertical.

Figure 4:
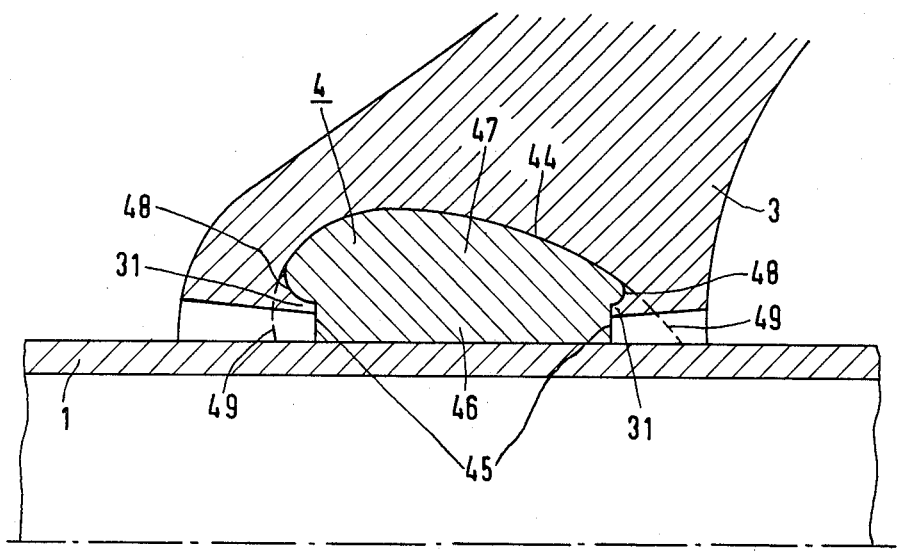
FIG. 4 shows an actual example of an embodiment of a control electrode according to the invention.

FIG. 4 shows a practical example of an embodiment of a control electrode acccording to the invention. For reasons of casting and manufacturing technology of the insulator, and due to electrical and mechanical considerations regarding the operation of an encapsulated, gas-insulated tubular line, this form is desirable, in which the support insulator 3 is not connected at all with the inner conductor 1, but is solidly connected with the control electrode 4, and in which the ends 31 of the support insulator reaching around the control electrode 4 still are strong enough to withstand all stresses during the operation of a tubular line. In this manner a control electrode 4 with mushroom-shaped cross section results, in which the transition between the spiral-shaped outer wall 44 of the roof 47 of the mushroom and the sides 45 of the base 46, which are parallel to each other and are at a right angle to the inner conductor 1, is accomplished by means of circular arcs 48. By means of the dashed lines 49 it is apparent that the mushroom is constructed so that the outer wall of its roof follows a Sici spiral, like the idealized control electrode of FIG. 3. All details necessary for attaching the control electrode on the inner conductor have been omimtted here, as they are unimportant for the explanation of the invention.

What is claimed is:

1. A control electrode which is attached between the inner conductor and an essentially conical non-perpendicular insulator which supports the inner conductor with the outer enclosure of an encapsulated gas-insulated tubular line characterized by the feature that its cross section is asymmetrical with respect to its mid-vertical perpendicular to the inner conductor wherein all parallel sections equi-distant from said mid-vertical are shorter on that half which is nearest the attachment point of the insulator to the outer enclosure than on the other half.

2. The control electrode of claim 1 further characterized by the feature that parallel sections equi-distant from said mid-vertical become increasingly shorter with increasing distance from said mid-vertical on the half of said shorter parallel sections.

3. The control electrode of claim 2 further characterized by the feature that its outer wall facing the outer enclosure has at least in part a radius of curvature which increases gradually from the half of longer parallel sections toward the half of shorter parallel sections.

4. The control electrode of claim 3 further characterized by the feature that its outer wall facing the outer enclosure is described mathematically as a logarithmic spiral, wherein its radius in polar coordinates is expressed by the equation $r=ae^k\phi$ where $a$ and $k$ are constants and $r$ is the radius vector length and $\phi$ is the angle.

5. The control electrode of claim 3 further characterized by the feature that its outer wall facing the outer enclosure is described mathematically as a Sici spiral which is obtained by plotting in a rectangular coordinate system having axes $f_1(x)$ and $f_2(x)$ for values of $x$, $x$ being a variable parameter the resulting values of the functions, $$f_1(x) = \int_{\infty}^{x} \frac{\cos t}{t} dt$$

and $$f_2(x) = \int_{\infty}^{x} \frac{\sin t}{t} dt - \frac{\pi}{2}.$$

6. The control electrode of claim 3 further characterized by the feature that its cross section is in the shape of a mushroom wherein the transitions between the spiralshaped outer wall of the roof of the mushroom and the stem of the mushroom connected to the inner conductor are in the shape of arcs of curves.

* * * * *